US010783650B2

United States Patent
Jesenko et al.

(10) Patent No.: US 10,783,650 B2
(45) Date of Patent: Sep. 22, 2020

(54) METHOD FOR REGISTERING AT LEAST TWO DIFFERENT 3D MODELS

(71) Applicant: a.tron3d GmbH, Klagenfurt am Woerthersee (AT)

(72) Inventors: Juergen Jesenko, Riegersdorf (AT); Andrej Reichmann, Klagenfurt-Viktring (AT)

(73) Assignee: a.tron3d GmbH, Klagenfurt am Woerthersee (AT)

( * ) Notice: Subject to any disclaimer, the term of this patent is extended or adjusted under 35 U.S.C. 154(b) by 56 days.

(21) Appl. No.: 16/046,331

(22) Filed: Jul. 26, 2018

(65) Prior Publication Data

US 2019/0057511 A1 Feb. 21, 2019

(30) Foreign Application Priority Data

Aug. 18, 2017 (EP) .................................... 17186847

(51) Int. Cl.
 *G06K 9/00* (2006.01)
 *G06T 7/33* (2017.01)
 *G06T 19/20* (2011.01)
(52) U.S. Cl.
 CPC ............... *G06T 7/344* (2017.01); *G06T 7/33* (2017.01); *G06T 19/20* (2013.01);
 (Continued)
(58) Field of Classification Search
 CPC .................. G06T 19/20; G06T 2200/04; G06T 2207/10028; G06T 2207/30036;
 (Continued)

(56) References Cited

U.S. PATENT DOCUMENTS 8,330,803 B2 12/2012 Frey et al.
9,563,954 B2 2/2017 Jesenko et al.
(Continued)

FOREIGN PATENT DOCUMENTS

DE 10 2005 118657 A1 5/2016
EP 2 144 036 A2 1/2010
(Continued)

OTHER PUBLICATIONS

EP Search Report, dated Oct. 26, 2017, from corresponding EP 17 186 847.4 application.

*Primary Examiner* — Charles T Shedrick
(74) *Attorney, Agent, or Firm* — Nixon & Vanderhye

(57) ABSTRACT

Disclosed is a method for registering at least two different 3D models, whereby the models image the same object at least in places, including: detecting and describing features in the 3D models; assigning features of the first 3D model to the features of the second based on descriptions that are as similar, for each feature of the first 3D model, a feature of the second is determined, and notating the first assignments as vectors, then performing the opposite assignment; comparing the vectors of the first and second assignments and determining common, bijective vectors of both, and randomly selecting at least three bijective vectors; applying the selected vectors to the first 3D model and checking whether the vectors essentially image common points of the 3D models; if successful, using the selected vectors to generate a transformation, and if not, discarding all vectors and rerunning of the method with other data.

20 Claims, 4 Drawing Sheets

(52) U.S. Cl.
CPC ............... *G06T 2200/04* (2013.01); *G06T 2207/10028* (2013.01); *G06T 2207/30036* (2013.01); *G06T 2210/41* (2013.01); *G06T 2219/2004* (2013.01)

(58) Field of Classification Search
CPC ......... G06T 2210/41; G06T 2219/2004; G06T 7/33; G06T 7/344
See application file for complete search history.

(56) References Cited

U.S. PATENT DOCUMENTS

| | | |
|---|---|---|
| 9,936,186 B2 | 4/2018 | Jesenko et al. |
| 2005/0089213 A1 | 4/2005 | Geng |
| 2010/0007719 A1* | 1/2010 | Frey ................. G01B 11/25 348/46 |
| 2015/0178908 A1* | 6/2015 | Jesenko .............. G06T 19/20 433/29 |
| 2015/0235104 A1* | 8/2015 | Van Lierde ............ G06T 7/10 382/128 |
| 2016/0125651 A1 | 5/2016 | Lior et al. |
| 2018/0005463 A1* | 1/2018 | Siegel ................. G07C 5/0808 |
| 2019/0131012 A1* | 5/2019 | Osawa ................ G06T 7/0012 |

FOREIGN PATENT DOCUMENTS

| | | |
|---|---|---|
| EP | 2 672 461 A1 | 12/2013 |
| EP | 2 886 043 A1 | 6/2015 |
| WO | 2014/049049 A1 | 4/2014 |

* cited by examiner

METHOD FOR REGISTERING AT LEAST TWO DIFFERENT 3D MODELS

The invention relates to a method for registering at least two different 3D models, whereby the models image the same object at least in places.

BACKGROUND OF THE INVENTION

In the technology for acquiring three-dimensional surface geometries, there is the ongoing quest for higher speed and precision when acquiring the geometry. An obvious step, in order to pursue this aspiration, is the continuous improvement of hardware both in the area of sensor technology and computers, which process the growing volume of data from the enhanced sensors increasingly quickly. In acquiring three-dimensional surface geometries, however, the software components are also just as important as the hardware. These can then be roughly divided into three categories according to their tasks: conversion of the sensor data into virtual 3D models, display or rendering, and notation or storage. However, the individual categories have a decisive influence on one another. Thus, for example, certain methods to convert sensor data into virtual models are suitable only for certain notations, and differently notated models require different steps in order to display the latter in a form that is suitable for the user.

A notation that is especially suitable for generating 3D models is the "Truncated Signed Distance Function" (TSDF). The biggest advantage of the TSDF is that supplementing a virtual 3D model that is notated in a TSDF with additional sensor data on the acquired object always leads to an improvement of the accuracy of the virtual 3D model, which can be proven mathematically. In the case of the other common notations, however, a falsification of data can occur.

If, however, several independent models, for example the left and the right halves of a row of teeth of a jaw or the rows of teeth of an upper jaw and a lower jaw are to be brought together in one notation, the TSDF has proven to be disadvantageous. The main reason for this is the fact that a TSDF, which as an implicit notation, is bound more strongly to the coordinate system in which it is notated than other, in particular explicit, notations.

SUMMARY OF THE INVENTION

The invention therefore has the object of overcoming the above-described drawback and of making available an improved method to register various 3D models to one another, which models image the same object at least in places.

This object is achieved according to the invention by a method with the features of claim 1.

As defined by the invention, registered means in this case that the exact spatial ratio in the at least two models, at which ratio the two models are in with respect to one another, is known. This spatial ratio can be notated, for example, in the form of a translation matrix.

A translation matrix usually consists of a rotation matrix and a translation vector, i.e., the information as to how and in which spatial dimensions a model, or the system in which the model is notated, has to be rotated and moved in order to be imaged onto the other model, or the system in which the other model is notated.

BRIEF DESCRIPTION OF THE DRAWINGS

Preferred embodiments of the invention are the subject matter of the dependent claims.

Additional features and advantages of the invention follow from the description given below of preferred embodiments of the invention, not limiting the scope of protection, with reference to the attached drawings. These show.

DETAILED DESCRIPTION OF THE PREFERRED EMBODIMENTS

In the depicted embodiment of the invention, the two TSDFs that are to be registered to one another later are first simplified. This is admittedly not necessary for the actual method for registering, but as a result, computational time and resources can be saved, and tests have shown that the simplification does not adversely affect the accuracy of the method. Simplification of the TSDF before the executing of the usual steps of the method is therefore an advantageous and preferred further development of the method according to the invention.

Figure 1:
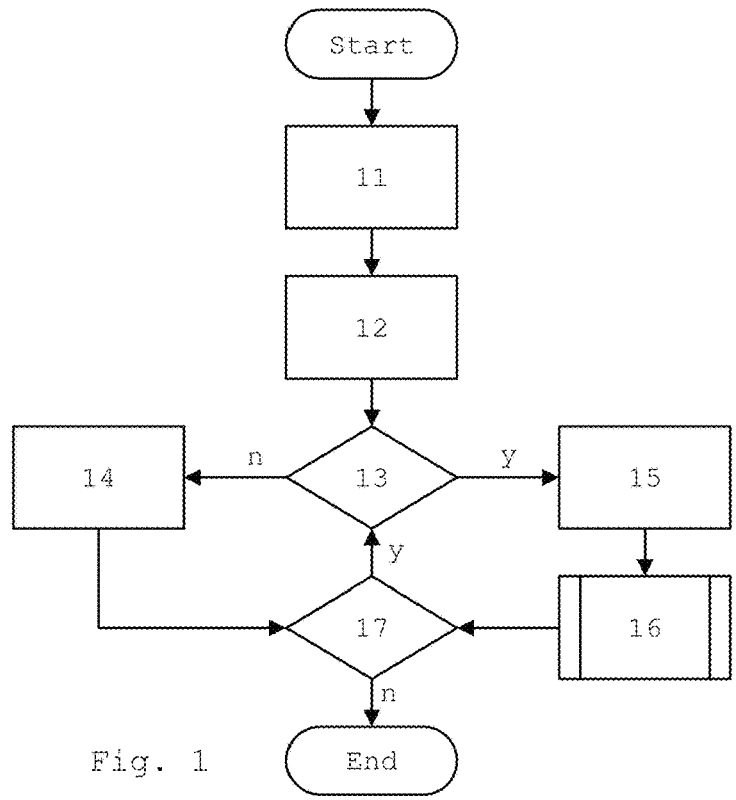
FIG. 1 a method for simplifying a 3D model that is notated in a TSDF.

FIG. 1 shows a possible example for the simplification of a TSDF. In this case, the TSDF is first loaded up in a Step 11. Loading in this case can be both retrieving from a storage device or intermediate storage device and the direct capturing of a "fresh" 3D model. The origin or the source of the 3D model is in any case insignificant for the invention.

In a next Step 12, the TSDF is divided into so-called bricks. In this case, the voxels of the voxel grid in which the TSDF is deposited are assembled into groups. In this case, for example, a brick can be a group of $8^3$ voxels. In principle, the entire voxel grid is thereby divided into bricks.

In the subsequent Step 13, the query as to whether a surface is located in a brick is made. This can be done, for example, by examining whether a change of sign takes place inside the brick. Since, in the voxels of a TSDF ("Truncated Signed Distance Function"), the distance ("Distance") between the voxel and the closest surface is always indicated and since the sign of the distance ("signed distance") indicates whether the voxel is located in the direction of the specified distance in front of or behind the surface, a simple way to check whether there is a surface in a brick is a change of sign of the values in the voxels. If there is no surface in a brick, the brick is discarded in Step 14. If the query from Step 13 is answered positively and the brick contains a surface, it is earmarked or marked in Step 15 for further use. If a brick has been marked in Step 15, a point can be assigned to it in Step 16. There are various ways to do this. In a very simple embodiment the point can thus, for example, lie in the center of the brick. After Step 14 or 16, it is checked in a Step 17 as to whether there is still (at least) one brick for which it was not determined whether it contains a surface. If there is still a brick for which a determination was not made whether it contains a surface, a return is made to Step 13. If there are no more bricks for which a check has not yet been made as to whether they contain a surface, the process can be terminated.

Figure 2:
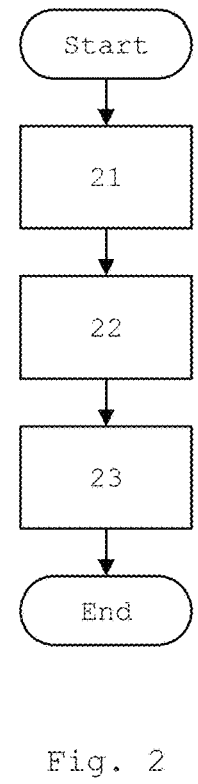
FIG. 2 a preprocessing step in the method of FIG. 3.

By way of example, FIG. 2 shows a method for obtaining features as they can be used for the rest of the method. To this end, first the simplified model from FIG. 1 is made available in a Step 21. In the subsequent Step 22, it is then examined for any point of the simplified model how the spatial adjacency of the point behaves with respect to the latter. If the point is located in an essentially uniform plane, it is classified as uninteresting and skipped. If instead the point is located in a valley or on a peak, it is considered to be a feature. In order to determine whether a point is located in a plane, it is tested whether possible connections to adjacent points are located in a plane or not, i.e., whether the geometry of the model greatly changes at this location or not. When the geometry changes in more directions, the feature is considered to be more unambiguous than when it changes in fewer directions.

If all (imaginary) connections to the adjacent points of a point are located essentially in a plane, the point in general is considered to be located in a plane. If the (imaginary) connections of a point to its adjacent points are located essentially in two planes, the point in general is considered to be located on an edge. If the connections of a point to its adjacent points are located in three or more planes, it is in general considered to be a peak or recess. Preferably only those points that are peaks or recesses are selected as features. This method is based to a large extent on the "Harris Feature Detector" that is known from the state of the art.

After the features were selected in Step 22, they are described in Step 23 based on their neighbourhood. In the depicted sample method, this description is a 33-dimensional vector.

It is to be noted that the adjacency of the point from Step 22 and the neighborhood described in Step 23 based on the 33-dimensional vector are not to be treated as being equivalent. While adjacency only determines whether a point is suitable as a feature in terms of the invention, the neighborhood describes the exact properties of a feature and makes it possible to evaluate the feature in later steps, in particular for comparison with other features.

Of course, notations other than 33-dimensional vectors are also conceivable for the features. It is important only that the notation be able to note the features in a sufficiently distinguishable manner; i.e., it is suitable as a feature descriptor. An example, known from the state of the art, for a feature descriptor, which is notated as a 33-dimensional vector, is, for example, the so-called FPFH ("Fast Point Feature Histogram"). By way of example, but not in a limiting manner, the following can be mentioned as additional examples: PFH ("Point Feature Histogram"), "3D Shape Context", GRSD ("Global Radius-based Surface Descriptor") and SHOT ("Signature of Histograms of OrienTations").

Figure 3:
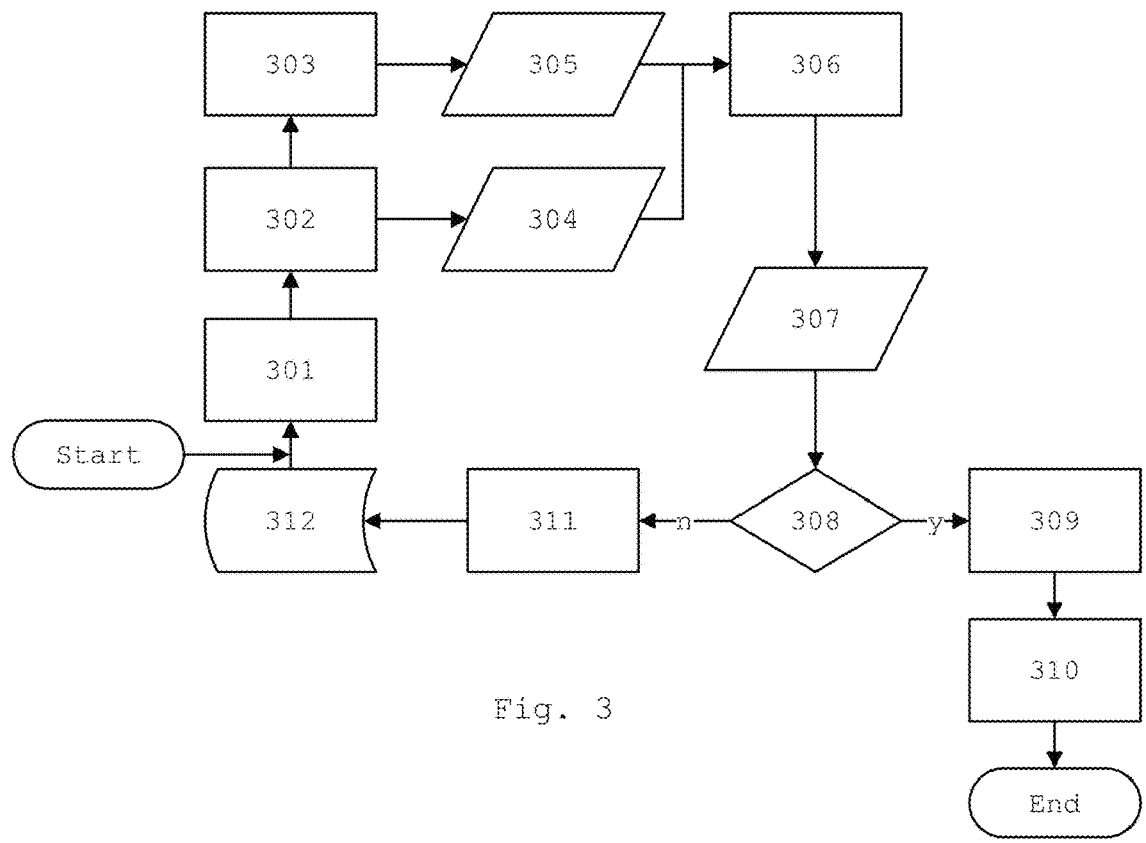
FIG. 3 a sample method according to the invention for registering 3D models, FIG. 4 a schematized depiction of a detail from FIG. 3, FIG. 5 a first practical example for the method according to the invention, and FIG. 6 a second practical example for the method according to the invention.

For the method shown in FIG. 3, first the sub-methods described in FIG. 1 and FIG. 2 are applied to two 3D models in the TSDF format that are to be registered. If the 3D models are present in another notation, methods other than the methods shown in FIG. 1 and FIG. 2 can, of course, be applied in order to obtain the starting data for the method according to the invention that is described by way of example in FIG. 3. Also, other methods can also be applied to 3D models in the TSDF format.

In Step 301, features of two 3D models that are described based on their neighborhood, for example based on the above-mentioned 33-dimensional vectors, are accordingly made available. This can be done, for example, by data transfer or loading from a storage device or else from a GPU. The exact source of the features described based on their (geometric) neighborhood used for the method is incidental to the invention, and one skilled in the art can select a corresponding method from the state of the art without altering the essence of the invention. By way of example, but not in a limiting manner, the following can be mentioned at this point: "Harris Feature Detector," CenSurE ("Center Surround Extremas"), ISS ("Intrinsic Shape Signatures"), NARF ("Normal Aligned Radial Feature"), SIFT ("Scale Invariant Feature Transform"), SUSAN ("Smallest Univalue Segment Assimilating Nucleus") and AGAST ("Adaptive and Generic Accelerated Segment Test").

Figure 4:
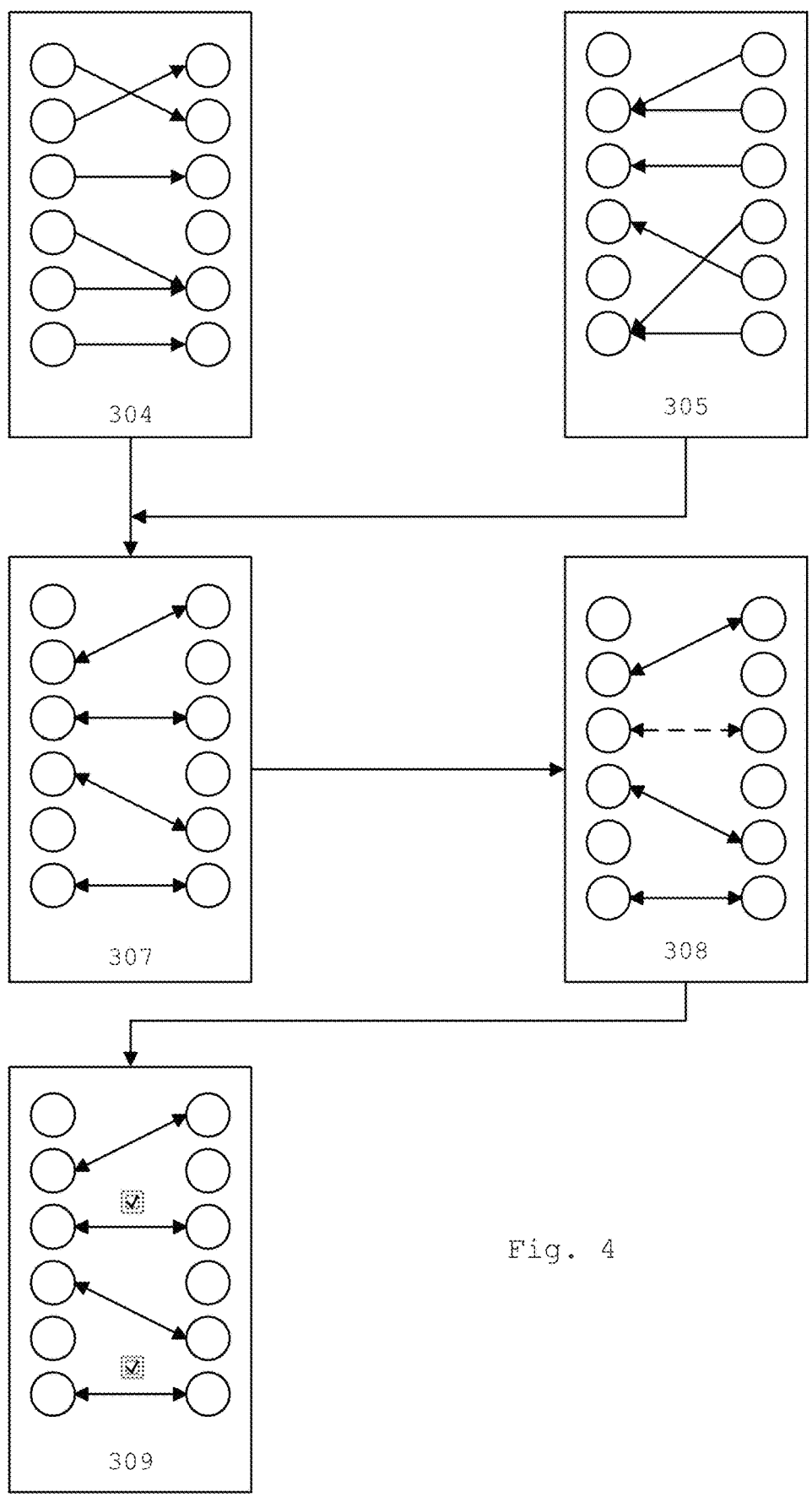

In Step 302, the so-called "Forward Matching" is then carried out. In this case, to each feature of the first 3D model a feature of the second 3D model is assigned based on descriptions that are as similar as possible in the depicted example, i.e., based on the greatest possible similarity of the 33-dimensional vectors. For this purpose, for example, the so-called "nearest neighbor algorithm" can be used. In this case, it may occur both that features of the second 3D model are double-occupied or likewise that features of the second 3D model are not assigned to any feature of the first model. These first assignments are then notated as vectors in Step 304. FIG. 4 shows a depiction of the assignments of Step 304 that is roughly schematized, greatly simplified, and two-dimensional and that is reduced for illustration to six symbolic features per model.

Similarly, in Step 303, to all features of the second 3D model features from the first 3D model are then assigned, and in Step 305, the second assignments that result therefrom are notated as vectors. This can also be referred to as "backward matching." Step 305 is also depicted in FIG. 4 in a correspondingly simplified form.

In Step 306, the first and second assignments are then compared to one another. In this case, all assignments that correspond to a bijective image, i.e., those that image the same features of the first 3D model onto the second 3D model and vice versa, are determined. These bijective assignments or vectors or else matchings are then notated in Step 307. A depiction of Step 307 that is similar to Steps 304 and 305 is also depicted in the previously-indicated way in FIG. 4.

In the subsequent Step 308, at least three of the bijective vectors are randomly selected, as is also depicted in the corresponding Step 308 in FIG. 4. The randomly-selected matchings or vectors are then applied to the first of the 3D models.

Then, it is examined whether, by applying the vectors, the first 3D model with those areas that the first 3D model has in common with the second 3D model is essentially imaged onto the second 3D model, in particular in those areas of the second 3D model that the second 3D model has in common with the first. This can be carried out within the framework of low tolerances, in particular since in a later step, another, finer transformation is implemented.

If this test was successful, successfully-tested vectors in Step 309 are used as a basis for a rough transformation. In another Step 310, the transformation is then refined or made more specific by means of the ICP algorithm (Iterative Closest Point Algorithm) that is known to one skilled in the art. Then, the method can be terminated. In this case, the refinement is preferably carried out on the basis of voxels of the two original TSDFs and not on the basis of the bricks obtained in the sub-method of FIG. 1.

The refinement by means of ICP further also offers an option to check the correctness of the determined registration. If the ICP error, i.e., the distances between the points that correspond to the ICP, is too large after refinement, the rough registration can again be discarded according to a preferred further development of the invention.

If the test from Step 308 leads to a negative result, the matchings in Step 311 are discarded. In addition, under certain circumstances, all features can also be discarded.

In Step 312, new data with which data Steps 301 to 308 are repeated are then made available to the method. These new data can be, for example, newly determined features. Preferably, for this purpose, not only the existing 3D models are re-examined for features, but rather at least one 3D model is expanded by additional surface information. Methods to add additional surface information to a 3D model (in particular a 3D model notated in a TSDF) are known from, for example, EP 2 672 461 A1 and EP 2 886 043 A1. The new data in Step j. of the method according to the invention can therefore also consist of the old data of the method that has been supplemented only by the data of a 2D image to form one of the 3D models. How a 3D model can be supplemented by the data of a 2D image is also explained in the steps mentioned above by way of example.

Figure 5:
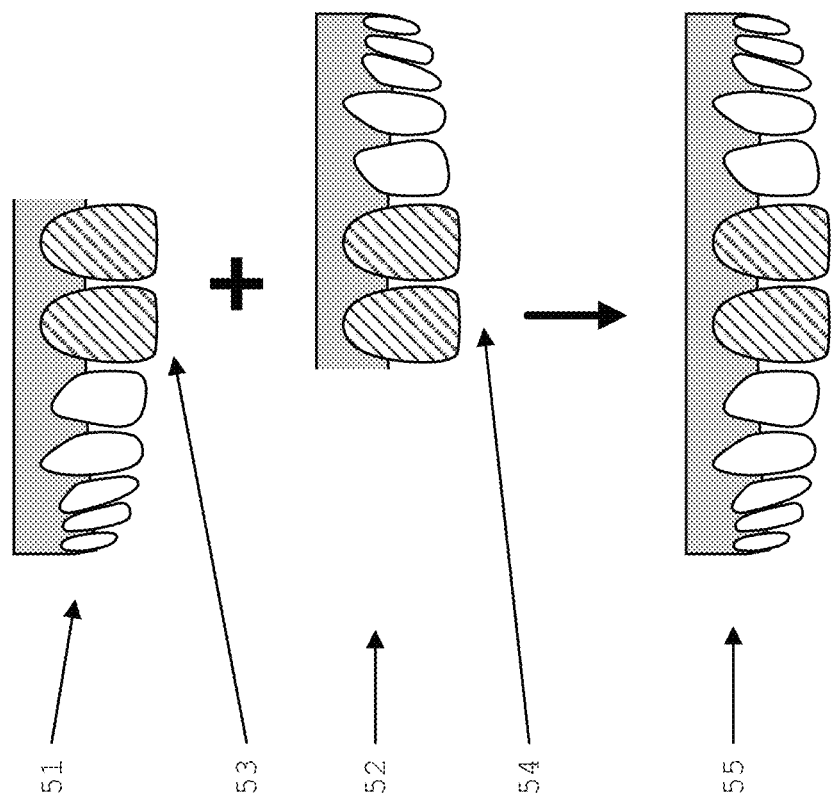

FIG. 5 shows, heavily schematized, a first practical example of the method according to the invention, in which two 3D models 51, 52 are combined. In the first 3D model 51, areas 53 that it has in common with the second 3D model 52 are depicted symbolically. In the second 3D model, areas 54 that it has in common with the first 3D model 52 are depicted symbolically. After the first 3D model 51 has been imaged with its area 53 that it has in common with the second 3D model 52 onto the corresponding common area 54 of the second 3D model 52, a common 3D model 55 is produced.

Figure 6:
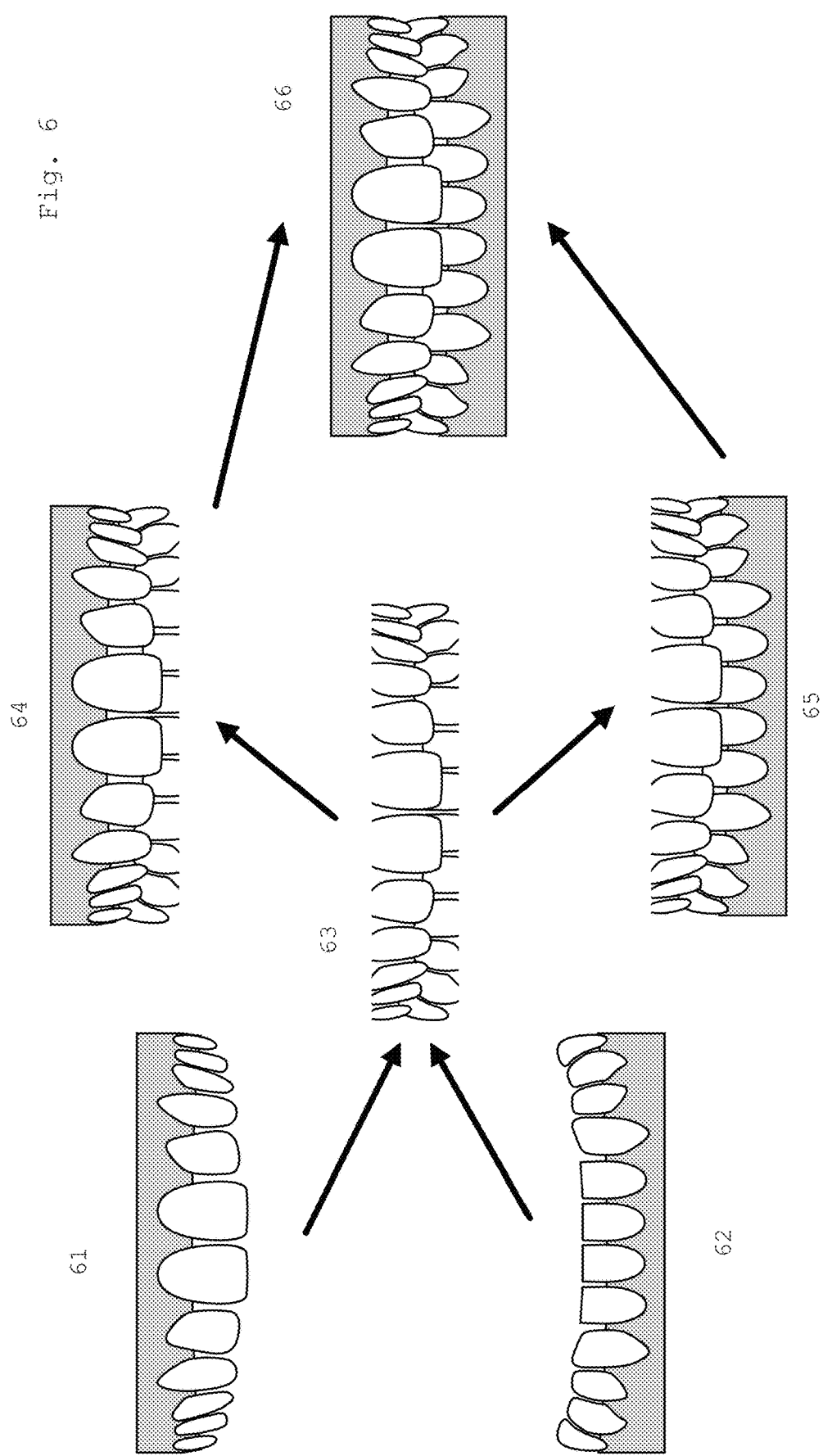

FIG. 6 shows, heavily schematized, a second practical example of the method according to the invention, in which two 3D models 61, 62 are registered via a third 3D model 63. The first 3D model 61 in FIG. 6 in this case shows symbolically an upper jaw. The second 3D model 62 in FIG. 6 shows symbolically a lower jaw. The third 3D model in FIG. 6 shows symbolically a bite of the two jaws that is known only in places. The third model is comparable to a bite registration, since it is used in traditional dentistry for determination of jaw relationships. As in the case of a bite registration, which images only the chewing surfaces of upper and lower jaws when biting, the third 3D model 63 shows only portions of the exteriors of the teeth of the upper and lower jaws when biting, since it is not possible, during biting, for a 3D scanner to detect the chewing surfaces or interiors (lingual sides) of the teeth.

In the practical example of the invention shown in FIG. 6, initially the first 3D model 61 is therefore registered with the third 3D model 63 to form a first intermediate registration 64 to acquire the correct jaw relationship together with a complete model of upper and lower jaws. Then, the second 3D model 62 is registered with the third 3D model 63 to form a second intermediate registration 65. Since the spatial relationship between the first and second 3D models 61, 62 and the third 3D model 63 is known via two intermediate registrations 64, 65, the spatial ratio of the first and second 3D models 61, 62 to one another is also known indirectly. In a final step, the two intermediate registrations 64, 65 can be assembled to form a final data set 66. The final data set 66 that is assembled then contains the geometric information on the upper and lower jaws as well as a jaw correlation corresponding to the bite.

The intermediate registrations 64, 65, shown in FIG. 6, in this case are used only for illustration. It is not necessary to combine the entire first and second 3D models completely with the third 3D model. It is sufficient for only a corresponding translation matrix consisting of a translation vector and a rotation matrix to be stored in the respective model. The two translation matrices can then be joined with a simple geometric operation so that upper and lower jaws can be correctly positioned with respect to one another in the fourth 3D model.

LEGEND TO THE FIGURES

11 Loading TSDF
12 Dividing into bricks
13 Does brick have a change of sign? (=surface in brick?)
14 Discarding (13→n) bricks
15 Marking (13→y) bricks for further processing
16 Assigning a point to the brick
17 Are there still un-examined bricks? n=>end, y=>back to Step 13
21 Making the simplified models available
22 Determining the features
23 Describing and notate all features based on their environment
301 Making available the features, describe based on their environment
302 Forward matching
303 Backward matching
304 Results from forward matching
305 Results from backward matching
306 Examining for identical matchings (bijective)
307 Identical matchings
308 Testing the identical matchings by means of RanSaC (minimum three random samples for the Random Sample Consensus) Test via RanSaC OK?//Solution found?
309 (38→y) Rough transformation
310 ICP (fine/exact transformation)
311 Discarding (38→n) matchings
312 New data
51 First 3D model
52 Second 3D model
53 Area of the first 3D model that the latter has in common with the second 3D model
54 Area of the second 3D model that the latter has in common with the first 3D model
55 Registered 3D model
61 First 3D model (upper jaw)
62 Second 3D model (lower jaw)
63 Third 3D model (bite registration)
64 First intermediate registration
65 Second intermediate registration
66 Fourth 3D model (upper jaw, lower jaw and jaw correlation)

The invention claimed is:

1. A method for registering at least two different 3D models, whereby the 3D models image a same object, the method comprising Steps of:
   a. detecting features in the 3D models;
   b. describing the features of the 3D models based on an environment of the 3D models;
   c. forward matching the features of a first 3D model of the two different 3D models to the features of a second 3D model of the two different 3D models, based on descriptions from Step b. of the two different 3D models, such that for each feature of the first 3D model a feature of the second 3D model is assigned as first assignments based on descriptions of the two different 3D models that are as similar as possible, and notation of the first assignments as first vectors;
   d. backward matching the features of the second 3D model to the features of the first 3D model based on the descriptions from Step b. of the two different 3D models, such that for each feature of the second 3D model a feature of the first 3D model is assigned as second assignments based on descriptions of the two different 3D models that are as similar as possible, and notating the second assignments as second vectors;

e. comparing the first vectors and the second vectors, and determining therefrom common, bijective vectors of the first and second assignments;

f. randomly selecting at least three bijective vectors from the bijective vectors that are determined in Step e.;

g. applying the selected vectors to the first 3D model and checking whether the selected vectors essentially image common points of the first 3D model with the second 3D model onto common points of the second 3D model with the first 3D model;

h. if the checking of Step g. is successful, using the selected vectors as a basis for generating a complete transformation of the first 3D model to form a coordinate system of the second 3D model; and i. if the checking of Step g. is not successful, discarding all vectors and rerunning the method with new data to form at least one of the 3D models.

2. The method according to claim 1, wherein at least one of the 3D models is notated in the form of a Truncated Signed Distance Function (TSDF).

3. The method according to claim 2, wherein the TSDF is simplified before the method is implemented.

4. The method according to claim 1, wherein the describing in Step b. is carried out in the form of a 33-dimensional vector.

5. The method according to claim 1, wherein the new data in Step i. are obtained by the addition of new surface information to form at least one of the 3D models.

6. The method according to claim 1, wherein the generating in Step h. is carried out by means of an Iterative Closest Point Algorithm (ICP), wherein an ICP error is determined, wherein a boundary value for the ICP error is set, and wherein when the boundary values are exceeded, Step i. is carried out next.

7. The method according to claim 2, wherein the describing in Step b. is carried out in the form of a 33-dimensional vector.

8. The method according to claim 3, wherein the describing in Step b. is carried out in the form of a 33-dimensional vector.

9. The method according to claim 2, wherein the new data in Step i. are obtained by the addition of new surface information to form at least one of the 3D models.

10. The method according to claim 3, wherein the new data in Step i. are obtained by the addition of new surface information to form at least one of the 3D models.

11. The method according to claim 4, wherein the new data in Step i. are obtained by the addition of new surface information to form at least one of the 3D models.

12. The method according to claim 2, wherein the generating in Step h. is carried out by means of an Iterative Closest Point Algorithm (ICP), wherein an ICP error is determined, wherein a boundary value for the ICP error is set, and wherein when the boundary values are exceeded, Step i. is carried out next.

13. The method according to claim 3, wherein the generating in Step h. is carried out by means of an Iterative Closest Point Algorithm (ICP), wherein an ICP error is determined, wherein a boundary value for the ICP error is set, and wherein when the boundary values are exceeded, Step i. is carried out next.

14. The method according to claim 4, wherein the generating in Step h. is carried out by means of an Iterative Closest Point Algorithm (ICP), wherein an ICP error is determined, wherein a boundary value for the ICP error is set, and wherein when the boundary values are exceeded, Step i. is carried out next.

15. The method according to claim 5, wherein the generating in Step h. is carried out by means of an Iterative Closest Point Algorithm (ICP), wherein an ICP error is determined, wherein a boundary value for the ICP error is set, and wherein when the boundary values are exceeded, Step i. is carried out next.

16. The method according to claim 7, wherein the new data in Step i. are obtained by the addition of new surface information to form at least one of the 3D models.

17. The method according to claim 8, wherein the new data in Step i. are obtained by the addition of new surface information to form at least one of the 3D models.

18. The method according to claim 7, wherein the generating in Step h. is carried out by means of an Iterative Closest Point Algorithm (ICP), wherein an ICP error is determined, wherein a boundary value for the ICP error is set, and wherein when the boundary values are exceeded, Step i. is carried out next.

19. The method according to claim 8, wherein the generating in Step h. is carried out by means of an Iterative Closest Point Algorithm (ICP), wherein an ICP error is determined, wherein a boundary value for the ICP error is set, and wherein when the boundary values are exceeded, Step i. is carried out next.

20. The method according to claim 9, wherein the generating in Step h. is carried out by means of an Iterative Closest Point Algorithm (ICP), wherein an ICP error is determined, wherein a boundary value for the ICP error is set, and wherein when the boundary values are exceeded, Step i. is carried out next.

* * * * *